United States Patent
Blanchet

(10) Patent No.: US 12,416,089 B1
(45) Date of Patent: Sep. 16, 2025

(54) MULTI-STACK ELECTROLYZER MODULE

(71) Applicant: EvolOH, Inc., Palo Alto, CA (US)

(72) Inventor: Scott Blanchet, Chelmsford, MA (US)

(73) Assignee: EVOLOH, INC., Palo Alto, CA (US)

( * ) Notice: Subject to any disclaimer, the term of this patent is extended or adjusted under 35 U.S.C. 154(b) by 0 days.

(21) Appl. No.: 19/035,618

(22) Filed: Jan. 23, 2025

(51) Int. Cl.
C25B 9/70 (2021.01)
C25B 1/04 (2021.01)
C25B 15/023 (2021.01)

(52) U.S. Cl.
CPC .......... *C25B 9/70* (2021.01); *C25B 1/04* (2013.01); *C25B 15/023* (2021.01)

(58) Field of Classification Search
None
See application file for complete search history.

(56) References Cited

U.S. PATENT DOCUMENTS

| | | | |
|---|---|---|---|
| 2016/0002795 A1 | 1/2016 | Beverage et al. | |
| 2022/0123325 A1 | 4/2022 | Sonkar et al. | |
| 2023/0357934 A1* | 11/2023 | Sanchez | H01M 8/04164 |
| 2024/0021859 A1* | 1/2024 | Mahler | C25B 15/027 |
| 2024/0088524 A1 | 3/2024 | Hoff et al. | |
| 2024/0141516 A1 | 5/2024 | Eisenlohr et al. | |
| 2024/0410063 A1* | 12/2024 | Ahola | C25B 1/04 |
| 2025/0027216 A1* | 1/2025 | Derfler | C25B 11/02 |

FOREIGN PATENT DOCUMENTS

| | | |
|---|---|---|
| CN | 113445070 A | 9/2021 |
| KR | 20240106014 A | 7/2024 |
| WO | WO 2013/090680 A2 | 6/2013 |

OTHER PUBLICATIONS

International Search Report, Appl. No. PCT/US2025/012787, May 16, 2025, 5 pgs.

* cited by examiner

*Primary Examiner* — Wojciech Haske
(74) *Attorney, Agent, or Firm* — Paul D. Strain, Esq.; Strain & Strain PLLC

(57) ABSTRACT

The present invention relates to modular packages of individual electrolyzer stack units arranged to overcome prior art limitations related to power supply costs, as-manufactured stack unit performance variation, operating stack unit performance variation, and operational reliability. The electrolyzer stack module comprises an even number of individual stack units wired in series-parallel and arranged to minimize variation between branches of series-connected stack pairs.

10 Claims, 10 Drawing Sheets

| branch | A [%] | ID | B [%] | ID |
|---|---|---|---|---|
| 1 | 2.17% | 001 | 9.18% | 013 |
| 2 | -6.29% | 002 | -3.10% | 014 |
| 3 | 7.79% | 003 | 8.61% | 015 |
| 4 | -7.89% | 004 | -1.42% | 016 |
| 5 | 6.27% | 005 | 9.45% | 017 |
| 6 | 2.23% | 006 | 0.14% | 018 |
| 7 | -6.81% | 007 | 8.35% | 019 |
| 8 | -7.44% | 008 | -6.04% | 020 |
| 9 | -4.95% | 009 | -7.75% | 021 |
| 10 | -8.99% | 010 | -0.11% | 022 |
| 11 | 0.43% | 011 | 3.18% | 023 |
| 12 | 6.63% | 012 | 2.87% | 024 |

FIGURE 2A

| branch | A [%] | ID | B [%] | ID |
|---|---|---|---|---|
| 1 | 9.45% | 017 | -8.99% | 010 |
| 2 | 9.18% | 013 | -7.89% | 004 |
| 3 | 8.61% | 015 | -7.75% | 021 |
| 4 | 8.35% | 019 | -7.44% | 008 |
| 5 | 7.79% | 003 | -6.81% | 007 |
| 6 | 6.63% | 012 | -6.29% | 002 |
| 7 | 6.27% | 005 | -6.04% | 020 |
| 8 | 3.18% | 023 | -4.95% | 009 |
| 9 | 2.87% | 024 | -3.10% | 014 |
| 10 | 2.23% | 006 | -1.42% | 016 |
| 11 | 2.17% | 001 | -0.11% | 022 |
| 12 | 0.43% | 011 | 0.14% | 018 |

FIGURE 2B

MULTI-STACK ELECTROLYZER MODULE

FIELD OF INVENTION

The present disclosure relates to electrochemical stacks and modular assemblies of stacks, more particularly, to specific arrangements of multi-stack electrolyzer systems configured to minimize performance variation and extend lifetime, as well as related methods.

BACKGROUND

Electrochemical cells are devices for inducing chemical reactions using electricity or generating electricity using chemical reactions. If electricity is the output, the cells may be considered fuel cells or expander cells, depending on the chemical product. If electricity is the input, the cells may be considered electrolyzer cells, compressor cells or purifier cells, depending on the chemical product. For example, an electrolyzer takes electrical energy and stores it in a fuel such as hydrogen by splitting water into its constituent elements. In contrast, a fuel cell may be thought of essentially as an electrolyzer running in reverse—hydrogen and oxygen are provided to the cell, which then combines these molecules to form water, releasing electrical energy in the process. Other chemical reactions may be promoted by use of an electrochemical cell or stack of cells such as the reduction of carbon dioxide into carbon monoxide, ethylene, or ethylene glycol, the reduction of nitrogen into ammonia or associated compounds, the formation of hydrogen peroxide from water and oxygen or the extraction of lithium from lithium brine solutions. The basic elements of these devices are two electrodes, an ion-conducting electrolyte, and an ion-permeable layer separating the two electrodes, although it is possible to operate an electrolyzer or fuel cell in a membrane-less configuration, as well. Electrochemical cells may also include a separator between the electrodes to prevent products from mixing inside of the cell. In the case of solid-electrolytic cells, the membrane and separator may be combined into a unitized, solid, ion-conducting layer. A complete electrochemical cell may also include flow fields for delivering reactants to the electrodes, seals for isolating reactants from each other and the environment, and one or more impermeable separator plates, also referred to as bipolar plates, for isolating one cell from adjacent cells in a stack and, in certain embodiments, for containing a separate cooling fluid for thermal management of the cell. Impermeability may be defined as a material having a permeability coefficient for a particular gas species of $<1.0 \times 10^{-11}$ [mol gas/(m s $Pa^{0.5}$)].

A variety of electrolytes can be used in electrochemical cells, including proton exchange membranes, anion exchange membranes, solid-oxide ceramic membranes, and liquid alkaline solutions such as potassium and sodium hydroxides and potassium and sodium carbonates. Different electrolytes demand different operating conditions, and each comes with its own benefits and limitations. Advantages of proton and anion exchange membrane electrolytes may include relatively low operating temperature and a cell that can be constructed using a unitized-layer electrolyte/membrane. Electrolyzers using such membranes have the distinct advantage over other electrolyzers of being able to operate using relatively pure, liquid water, rather than a caustic solution or water vapor as a feed stock, thereby greatly simplifying the balance of system in practice. Relatively pure water may be defined as water containing no more than 5% by weight of elements other than hydrogen and oxygen. Such electrolyzers may also be operated without liquid water on the cathode, allowing production of hydrogen in a gas phase having non-zero vapor-phase moisture content. A non-zero vapor-phase moisture content may be defined as gas containing more than one part per million water vapor, by volume.

The impact of carbon dioxide on global climate change is well-documented. As society's efforts to address global climate change accelerate, the need for deep decarbonization of most or all human energy use has become clear and urgent. The use of hydrogen as a carbon-free energy carrier is essential to reaching certain segments of human industry that are difficult or impossible to decarbonize directly with electricity. Examples of such segments include steel production, fertilizer manufacturing, construction, and heavy transport such as trucking, marine and air vehicles. In addition to these segments, the energy density and stable storage characteristics of hydrogen has made it the most viable candidate for seasonal-scale energy storage and establishment of grid resiliency using only renewable electricity, which will be required for complete conversion of energy use to carbon-free sources. These and other benefits have driven a high level of interest in "green hydrogen" production.

Hydrogen is given a "green" label if it is produced by electrolysis from renewable electricity (wind, solar, hydropower, etc.). Other "colors" of hydrogen are conventionally assigned to other energy sources. The scale required to meet the potential demand for green hydrogen in the future global energy system is daunting. Production capacities for electrolyzers will need to increase by many orders of magnitude and their costs reduced by a factor of ten or more over the next decade to meet such demand. Up to now, production of hydrogen electrolyzers has been a niche industry with small systems and limited deployments based on cells and stacks designed for research and development. Only minor considerations have been made for the speed of manufacturing necessary to produce and assemble cells and stacks at a rate commensurate with society's eventual need. Additionally, the vast number of independent electrolyzer stacks that must be networked both fluidically and electrically to achieve the necessary scale has not been adequately considered. For instance, the configuration of electrical connections for many independent electrolyzer stacks may have a significant impact on variability, reliability, resiliency, efficiency, and/or lifetime of the stacks.

The largest electrolyzer systems deployed so far are in the 10's of megawatt scale, and typically involve sites comprising many smaller, complete systems including both stacks and the associated balance of plant ("BoP"). While this is convenient for small deployments, including a BoP with every stack means economies of scale for mature BoP machinery such as pumps and power supplies cannot be leveraged for cost reduction. The design-scaling characteristics of process equipment such as pumps and power supplies are fundamentally different than that of electrolyzer stacks. Pumps, for instance, are scaled by increasing the physical size of a single impeller and motor. Conversely, electrolyzer stacks are only scaled by packaging additional active area of membrane and electrode into a unit cell and stack. Electrolyzer stacks are inherently modular, scaling with area, while process equipment inherently scales with volume. This means that as larger systems are designed, the lowest cost may be achieved by using single, larger units for BoP equipment, combined with multiple, modular units for electrolyzer stacks. Therefore, as system size and scale grows, larger pumps and power supplies are desired, while electrolyzer stack unit count must necessarily be increased.

BRIEF SUMMARY

Utility-scale, green hydrogen production requires many gigawatts (GW) of individual electrolyzer stack units to be deployed and connected to renewable energy sources. An individual stack unit may be defined as a single set of individual electrolyzer cells contained between a pair of end units such as fluid manifolds and compression plates. Selection of the unit stack capacity is a key first step in optimizing such large deployed systems. Unit stack capacity may be specified in terms of power consumption (kW, MW) or hydrogen production rate (kg/day, kg/hour). For example, unit stacks of too small a capacity may result in excessive complexity and cost due to the number of required electrical and plumbing connections between stacks. For example, unit stack capacities of less than 250 kW or 100 kg/day may be too small for large-scale hydrogen deployments. However, unit stacks of too high a capacity may result in difficulty shipping, installing, and/or maintaining those units due to their physical size and weight. For example, unit stack capacities of greater than 5 MW or 2,000 kg/day may be too large for efficient logistics, installation, and/or maintenance in the field, as these stacks may not fit in standard shipping containers (i.e., ISO containers 40 feet long or less). Likewise, unit stacks weighing more than 2,000 kg may be too heavy for efficient logistics, installation, and/or maintenance in the field as these stacks may not be easily manipulated with standard rigging and forklift machinery. Traditional alkaline electrolysis stacks typically fall in the category of "too large", where specialized shipping allowances are required, and additional onsite equipment such as cranes must be built into the plant to enable service. This situation results in non-value added cost and space at the plant site. The optimum stack capacity is the largest capacity possible (to minimize interconnection costs) while still enabling standard, low cost shipping (e.g., ISO shipping containers) and easy on-site service (e.g., handling with a standard forklift). The specific optimum capacity may depend on technology, where higher power density technologies such as PEM and AEM may enable higher stack unit capacities while still staying below the physical size and weight limitations described above.

Another significant consideration in configuring multi-stack systems is related to the as-manufactured performance and lifetime variation from stack to stack. Prior art, multi-stack systems have typically addressed this issue by pairing a single, controllable pump and power supply unit with an individual stack unit or a few (2-3) series-connected stack units. The number of series-connected stack units is typically limited by the voltage ratings of available power supplies (e.g., 1500 VDC). Each such power supply may then be adjusted to account for the real-world performance variation of the stacks. However, this arrangement limits the total number of stack units that may be paired with a single power supply, thereby limiting economies of scale for cost reducing the power supply. For achieving the greatest scale, it may be desirable to configure stack units in a series-parallel arrangement, thereby optimizing the voltage-current-power specifications of a multi-stack module for pairing with large scale, off-the-shelf power supply systems. In this way, one or more multi-stack modules may be paired with a single, large-scale, low-cost power supply without the need to individually control current to each stack unit. This configuration provides the additional advantage of being able to service or replace stack units individually without the need to replace an entire, high capacity module. The challenge for such a configuration is in managing the variability of performance and decay rate amongst the many stack units within the module without the benefit of the independent current control to each stack embodied by prior systems.

Recognizing the urgent need for large capacity electrolyzer plants for eliminating fossil fuel use, the present application is directed toward configurations for multi-unit, modular assemblies of individual electrolyzer stack units. Embodiments of the present application are directed to the design, manufacturing, and maintenance of those modular assemblies, and include innovative, networked arrangements of stacks where multiple stacks are connected to a single, controllable power supply to maximize the size and minimize the cost of power electronics. The choice of network configuration for multi-stack systems of this type can result in significant limitations to operating performance and lifetime of the system. These limitations may include:

High current demand due to a relatively low voltage input for a single electrolyzer stack. This may result in the need for large amounts of electrical wiring and conducting materials such as copper.

Complexity in wiring and/or plumbing between stacks inside the modular system ("module") and the balance of plant supplying electricity and fluids to the module.

Excessive variation in operating point for individual stacks within the module leading to inefficient operation, imbalance in stack unit output, and accelerated degradation, thereby shortening the lifetime of the one or more stack units in service.

The description below will focus on water electrolysis for hydrogen production for clarity, but may be applied to other electrochemical processes such as fuel cells, hydrogen compressors, hydrogen expanders, carbon dioxide electrolyzers, ammonia electrolyzers, lithium brine electrolyzers, and other electrochemical processes by one skilled in the art.

The basic process of water electrolysis involves providing water to a positively charged anode and conducting ions between the anode and a negatively charged cathode. Oxygen gas is produced at the anode while hydrogen gas is produced at the cathode. The particular ion conducted between the anode and the cathode depends on the electrolyte used. In an acidic cell, positively charged hydronium ions ($H_3O^+$) are conducted from the anode to the cathode. In an alkaline cell, negatively charged hydroxide ions ($OH^-$) are conducted from the cathode to the anode. In both systems, the overall reaction is the same: $(2)H_2O(l) \rightarrow (2)H_2(g)+O_2(g)$. Electricity must be provided to drive the reaction. The open-circuit, or thermo-neutral, voltage for the basic reaction of hydrogen to liquid water is 1.481V, therefore a voltage higher than 1.481 V must be applied to a hydrogen electrolysis cell fed with liquid water to cause the reaction to progress (as discussed below, an overpotential is usually required for the reaction to proceed at acceptable rates). The size (i.e., active area) of the cell determines the rate of hydrogen/oxygen production from one cell at a given applied voltage. The total current required for a particular applied voltage may be proportional to the active area of the cell. In practical systems, multiple cells may be "stacked" on top of each other to increase production capacity. This stacking of cells results in the need to apply a higher voltage (integer multiple of the cell count) to drive the reaction. For example, a single cell of 1000 $cm^2$ active area may produce the same hydrogen flow as two stacked cells of 500 $cm^2$, but the 500 $cm^2$ stack will require an input of 2 times the voltage and ½ of the current. Flexibility in selecting required voltage and current may be a significant consideration in the design and cost of a total electrolysis system. For example, power supplies for higher current and lower voltage may be more expensive than those for higher voltage and lower current due to the size of the required electrical conductors and additional materials required for their construction. Therefore, an easily scalable cell active area is a significant advantage for cost and flexibility of deployment. Additionally, the ability to wire individual stack units in either series or parallel may provide further flexibility in trading higher voltage for lower current, thereby saving materials cost in the power supply.

During production of electrolyzer cells and stacks, variations in raw materials and manufacturing processes may be present. These variations may result in performance variation between stacks units produced over time and that performance variation may not be known until the production stacks are fully assembled and tested. Material and manufacturing variations may also result in differences in ageing characteristics between stack units produced over time, which may not be known until such stacks are deployed and operating for some time in the field. While it is ideal for the supply chain and manufacturing process for stacks to be arranged such that variation in performance and lifetime of all stack units is zero, or at least insignificant, achieving such a goal may be impractical and unrealistic, especially with newer technologies and early in the development cycle for these technologies.

Electrical connections between multiple stacks with a single power source may occur in series, in parallel, or a combination of these. Wiring stacks in series delivers the same current to both stacks and requires the power source to apply a voltage equal to the sum of that required for the two stacks. Wiring stacks in parallel applies a fixed voltage to the pair of stacks and requires the power source to deliver a current equal to the sum of the two stacks' current demand. In a network of stack units, stacks wired in series may be referred to as a "branch" while stacks wired in parallel may be referred to as a "bank". For example, a system of 6 total stacks with pairs of stacks wired in series and those pairs wired in parallel may have three total "branches" each containing 2 stacks and two unique "banks" each containing 3 stacks, where one bank is connected to the high voltage side and the other bank is connected to the low voltage side of the power source. The total voltage available from off-the-shelf power supplies is typically limited to standard voltage "classes". For example, power electronics developed for the solar industry may be highly available and low cost but may fall into categories such as 1,000 volt-class, 1,500 volt-class, or 2,000 volt-class systems. To utilize these low cost power supplies the number of stack units wired in series may be limited to 2 stacks, or 3 stacks, or 4 stacks, depending on the number of individual electrolyzer cells in each stack unit. Therefore, to achieve the desired overall capacity of utility-scale electrolysis plants, individual stack units or small groups of series-connected stack units may necessarily be wired in parallel.

For stack units or branches wired in parallel, a fixed voltage will be applied by the power supply to the conductors (i.e., "bus bars") connected to the stack terminals. The total current delivered may be the sum of the current demanded at the applied voltage for each stack unit. The current demanded by each stack unit or branch may be different and may depend on the unique performance characteristics of the as-manufactured stack units comprising each branch. The rated current for all stack units may be the same based on the product specification. Therefore, variation in the delivered current from unit-to-unit or branch-to-branch in a parallel connected network may result in some stacks or branches getting less current than they should and some stacks or branches getting more current than they should. The variation in delivered current, in turn, may result in some stacks producing less hydrogen than specified and some stacks producing more. The ultimate goal of the system at the plant level may be to achieve a certain overall hydrogen production rate. In this case, the sum of the hydrogen produced by all stacks must achieve the overall hydrogen demand at the plant-level. Given the variation in individual stack unit performance, the bus voltage of the parallel network may need to be adjusted to achieve the net required hydrogen production, while some stack units underperform and some stack units overperform. This variation may have impacts on the efficiency, reliability, resiliency, and/or lifetime of the individual stack units in the network.

For networks of single stack units wired in parallel, the variation between branches may be proportional to the as-manufactured variation of each stack unit. For networks of series-connected stack units in each branch, the variation may be proportional to the resulting sum of the performance variation for each stack in the branch. For example, for branches consisting of pairs of 2 stack units, the sum of the performance characteristics of the two stacks selected for each pair will determine the current demanded by that branch at a given applied voltage. A polarization curve is a typical performance indicator for an electrochemical cell or stack unit and represents the voltage-current characteristics of that unit. The voltage-current characteristics may also be referred to as the impedance characteristics of the stack. With two stacks in series in a branch, the current is necessarily the same through each stack in the branch. The polarization curves for each stack in the branch may then be added in voltage to determine the impedance characteristics of the branch. As the branches are wired in parallel, it is now the combined branch impedance characteristics that will determine the variation in current delivered to each branch rather than the characteristics of each stack. If stacks are paired for branches randomly (for instance, in the order they come off the manufacturing line) the end result may be that low-performing stacks are paired with other low-performing stacks and the resulting impedance variation may be amplified due to the choice of stack order in the network. For instance, if two stack units with performance 10% below average are paired, the performance of the branch may be the sum of these, or 20% below average. In this way, creating a parallel network of series-connected pairs of stack units creates the risk of amplifying as-manufactured variation in performance compared to simple parallel connection of the individual stacks. Conversely, if low-performing stacks are paired with high-performing stacks this amplification may be cancelled by bringing the impedance of the sum of the stack pair closer to the average rather than further from the average. Due to the fact that prior art electrolyzer systems employing multiple stacks have typically wired individual stacks or small groups of series-connected stacks to an individual power supply (i.e., not in combined series-parallel networks), the problems associated with variation amplification described here would not occur, as the individual power supply may simply adjust its output to match the variation as deployed. As alluded to above, configurations having individual stacks or small groups of series connected stacks with individual power supplies necessarily use many power supplies, driving up cost.

As production of electrolyzer stack units typically involves an end of line quality control test where performance of each stack unit is characterized, it may be advantageous to use these data to select stack units for combining into branches in order to reduce the net variation seen when combining stacks in series-parallel networks within a stack module. This may generally be accomplished by combining low- and high-performing stack units within a branch to bring the sum of performance for each branch close to the average performance for a given module. If the branches consist of pairs (quantity 2) of stack units, the optimum pairing of stacks for assembly of a stack module may be found by: (1) producing and testing all stacks units for a given module ([N] stack units, where [N] is an even integer number); (2) Rank ordering the produced stack units by performance from high to low (rank 1→N); (3) matching the highest ranked unit [1] with the lowest ranked unit [N]; (4) matching the second highest ranked unit [2] with the second lowest ranked unit [N−1]; repeating step (4) until all stack units have been matched with their pair; (5) wire the resulting pairs in series to form branches within the module; (6) wiring the resulting branches in parallel for connection to a power source. This method of matching may result in the maximum average performance and minimum variation for the branches in the module.

It may seem more efficient to build one stack with twice as many cells to form a branch rather than pairing two individual stacks for a branch. However, breaking a group of cells into two distinct stacks rather than one may reduce the impact of as-manufactured variation between cells and stacks on variation between branches in a module. Series-pairing of stack units with quantity "Z" cells may have an advantage over production of single stack units with "2*Z" cells. Manufacturing stack units with "2*Z" cells would effectively permanently "pair" two half-stacks of "Z" cells in the order of production with the associated random performance characteristics rather than affording the opportunity to performance-match each half-stack "Z" as discrete stack units into pairs. The aforementioned process of pairing stacks into branches of two may be extended to series-connected branches of three or more stacks by analogous approaches of ranking and matching or alternate optimization methods for minimizing impedance variation between branches in a module.

The method of matching described above may also be applied to the service of stack modules operating in the field to recover performance, reduce variation developed over time, and/or optimize the arrangement of the series-parallel network within the real environment of the plant. Performance of the individual stack units within the module may be measured with the appropriate instruments while operating in the field. Instruments may include current monitoring for each branch using an appropriate direct current (DC) instrument such as a shunt resistor or Hall-effect transmitter. Instruments may include voltage measurement devices for the positive bus connection, negative bus connection, intermediate connections between stack units in a branch, and/or individual cell voltages within stack units. The module may also be equipped with manual or automatic DC disconnect switches on the positive or negative or both connections for each branch. Those data may be used to determine that a particular branch should be electrically isolated using the installed disconnect due to low performance. Electrical isolation of a particular branch may be done without fluidically isolating the same branch since it may be desired to keep the water supply flow rate to the fluid-parallel network of stacks in the module constant to ensure the cooling provided to each stack remains constant. The measured performance data may be used to rank order the stacks within the module by performance level in-situ. That ranking may then be used to perform service on the module wherein the stacks are rearranged into groups that minimize variation between branches. This service procedure may be performed as soon as the module is deployed (beginning of life) or at any time during the life of the system (e.g., periodically to maintain high performance—monthly, yearly, every two years, etc.). The described service procedure may allow stack modules to be field-optimized for performance. The described service procedure may allow modules that have poor performance due to degradation to be refurbished and performance to be improved for the remaining operational lifetime.

The stack units may also optionally be connected in a series-parallel relationship via electrical connections that permit selective reconfiguration of the electrical network while maintaining the overall series-parallel architecture. As individual stack units degrade or fail over time, the network may need to be temporarily adjusted—e.g., to permit maintenance—or permanently reconfigured to maximize performance and extend remaining life. As discussed above, one option for network reconfiguration involves physical rearrangement of stack units according to measurements obtained during operation, without reconfiguring the underlying electrical network. Alternatively, the stack units can remain physically static while the electrical network is reconfigured by altering the electrical paths in the network. One approach employs a modular patch/patch panel system, where removable conductive links or jumpers can be manually or automatically inserted or removed to establish different electrical connection patterns between the stack units while maintaining the fundamental series-parallel relationship. A patch panel optionally includes labeled connection points corresponding each stack unit, allowing an operator to physically reconfigure the network. In another embodiment, the network employs a matrix of electromagnetic relays or contactors. Each relay or contactor can establish or break connections between specific stack units under automated control. The relay/contactor matrix enables rapid reconfiguration without manual intervention while providing electrical isolation between switching elements. A further embodiment utilizes solid state switching devices arranged in a switching network. The semiconductor-based switches, which may include devices such as MOSFETs, IGBTs, or thyristors, route current between loads through electronic control signals. This approach enables fast switching speeds and eliminates mechanical wear associated with physical contacts.

It is to be understood that both the foregoing general descriptions and the following detailed descriptions are exemplary and explanatory only and not restrictive of the disclosure, as claimed. Further objects, features, and advantages of the present application will become apparent from the detailed description of preferred embodiments which is set forth below, when considered together with the figures provided.

BRIEF DESCRIPTION OF DRAWINGS

The accompanying drawings are incorporated into and constitute a part of this specification. The drawings illustrate certain embodiments only of the present disclosure and, together with the foregoing and following descriptions, explain the principles of the disclosure. Wherever possible the same identification numbers have been used to indicate common or like components across different figures.

FIG. 2A shows a table of 24 stack units and their simulated voltage relative to the average paired by random order.

FIG. 2B shows the stacks for FIG. 2A paired by rank order according to a preferred embodiment of the present invention.

DETAILED DESCRIPTION OF DRAWINGS

Figure 1A:
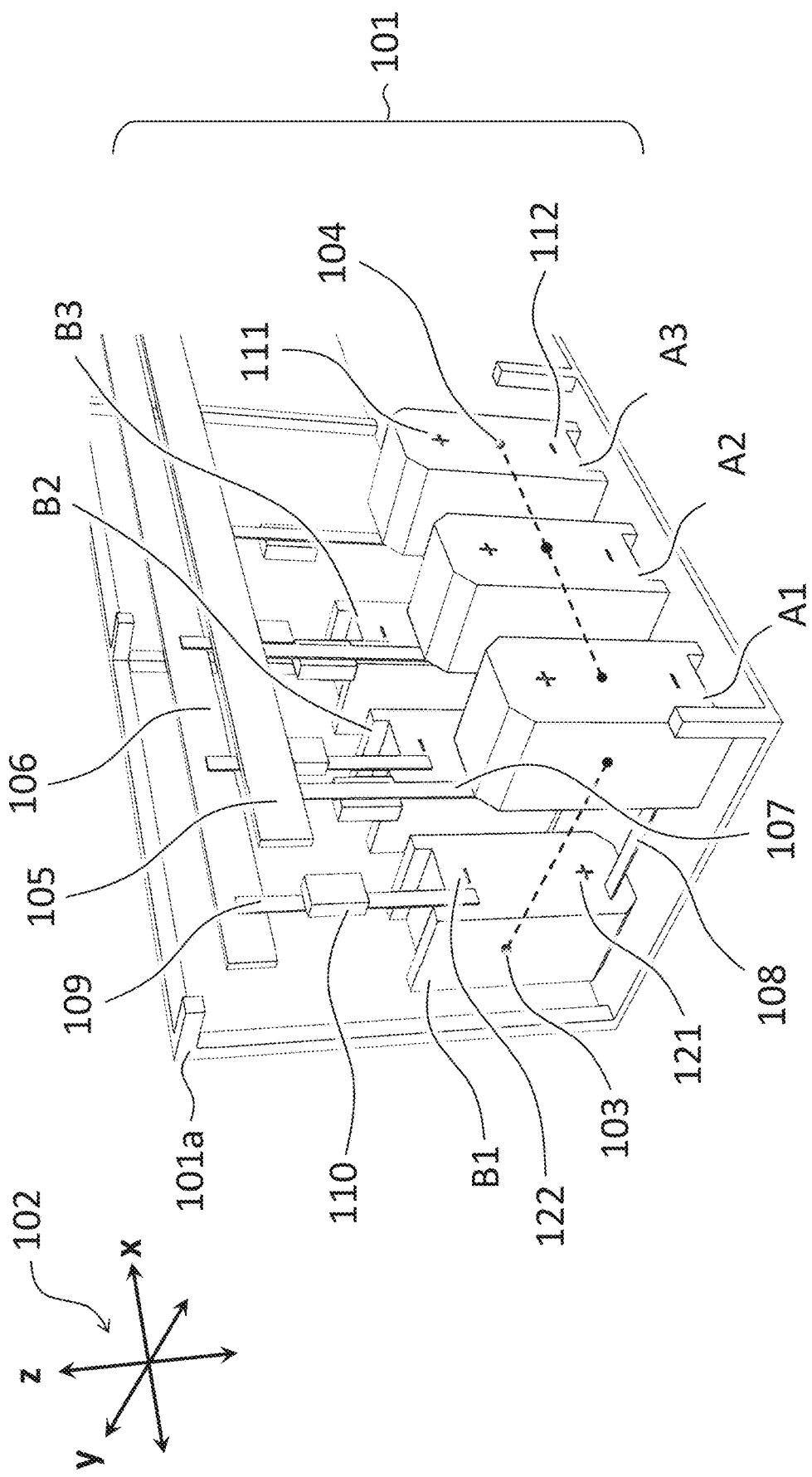
FIG. 1A shows an electrolyzer stack module comprising 6 stacks arranged with 3 branches and 2 banks along with branch disconnects for both positive and negative terminals of each branch.

Detailed descriptions of several preferred embodiments will now be given in reference to the accompanying drawings. Although descriptions relate to water electrolysis, it is understood that the described features, components, and methods are applicable and adaptable, by those skilled in the art, to other electrochemical technologies including reduction of carbon dioxide into carbon monoxide, ethylene, or ethylene glycol, the reduction of nitrogen into ammonia or associated compounds, the formation of hydrogen peroxide from water and oxygen or the extraction of lithium from lithium brine solutions, hydrogen compressors, hydrogen purifiers, and fuel cells.

Definitions

For convenience we may define a cartesian coordinate system with perpendicular x-y-z axes where "x" is parallel to the general direction of water flow through an electrolysis cell, "y" is perpendicular to x, but in the same plane defined by a single electrolysis cell, and "z" is generally parallel to the direction of stacking of the cells.

As used herein, the singular forms "a", "an", and "the" include plural references unless indicated otherwise. It is noted that in this disclosure, terms such as "comprises," "comprised," "comprising," "contains," "containing" and the like can have the meaning attributed to them in U.S. patent law; e.g., they can mean "includes," "included," "including" and the like. Terms such as "consisting essentially of" and "consists essentially of" have the meaning attributed to them in U.S. patent law, e.g., they allow for the inclusion of additional features or steps that do not detract from the novel or basic characteristics of the invention, i.e., they exclude additional unrecited features or steps that detract from the novel or basic characteristics of the invention. The terms "consists of" and "consisting of" have the meaning ascribed to them in U.S. patent law; namely, that these terms are closed ended. Accordingly, these terms refer to the inclusion of a particular feature or step and the exclusion of all other features or steps.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a value is close to a targeted value, where close can mean, for example, the value is within 80% of the targeted value, within 85% of the targeted value, within 90% of the targeted value, within 95% of the targeted value, or within 99% of the targeted value.

The term "ISO container" or "standard ISO container" means a shipping container measuring approximately 8 feet, 6 inches in height, 8 feet in width, and having a length of 10, 20, 24, 28, 40, 44, 45, 46, 53, or 56 feet in length. If not specified, the length of an "ISO container" or "standard ISO container" under discussion or recited in a claim shall be 40 feet or less. A "tall", "high cube", or "hi-cube" ISO container measures approximately 9 feet, 6 inches in height.

The term "stack unit" means a single set of individual electrochemical cells contained between a pair of end units such as fluid manifolds and compression plates.

In a network of stack units, the term "branch" means one or more stack units wired in electrical series. In a network of stack units containing a plurality of branches, each branch having the same number of stack units, the term "bank" refers to all stack units that occupy the same relative position within their respective branches. For example, in a network in which each branch contains two stack units, all of the stack units directly connected to a positive buss bar would comprise a first bank, and all of the stack units directly connected to a negative buss bar would comprise the second bank.

In the context of this application, the terms "wire", "wiring", "wired", and the like are used to connote a low impedance (less than 10 milliohms, preferably less than 1 milliohm, most preferably less than 100 microohms) electrical connection between two components. Accordingly, these terms should be read to encompass any conductor or plurality of conductors capable of making such low impedance electrical connection, including (but not limited to) clad and unclad physical wires and metal strips or bars.

The term "rated" refers to the design value specified by the manufacturer, or, if no value has been specified, the value actually observed under normal operation. Normal operation is operation of a device as would be undertaken by a person having an ordinary level of skill in the art.

FIG. 1A illustrates a multi-stack electrolyzer module (101) comprising six individual stack units (A1, A2, A3, B1, B2, B3) within an exemplary container (101a). Coordinate system (102) is shown for convenience of description with an x-axis aligned with a long dimension of container (101*a*), a y-axis aligned with a short dimension of container (101*a*), and a z-axis aligned with the height dimension of container (101*a*). Stack units are arranged in pairs comprising branches (103) and a series of branches comprising banks (104). Bank "A" comprises stacks (A1, A2, A3) while bank "B" comprises stacks (B1, B2, B3). The stack units in bank A are oriented along the z-axis (102) with their positive terminal (111) up and negative terminals (112) down. The stack units in bank B are oriented along the z-axis (102) with their positive terminal (121) down and negative terminals (122) up. This arrangement minimized the length of the wiring connection (108) between the stacks in each branch compared to having all stacks in the same orientation. The stacks in each branch (A1-B1, A2-B2, A3-B3) are wired in series with the positive terminal of the A-bank stacks (111) connected to the positive module bus bar (105), and the negative terminal of the B-bank stacks (122) connected to the negative module bus bar (106). The negative terminals of the A-bank stacks are connected to the corresponding positive terminals of the B-bank stacks with interconnect wiring (108) to form a series-circuit along the y-axis direction of the module. Connections (109) of each bank of stacks to the positive (105) and negative (106) bus bars results in electricity being provided in parallel to each of the three branches. Current measurement and DC disconnect device (110) is provided on each of the 6 stack connections (109) to enable individual branches to be monitored for current draw and disconnected if necessary without shutting the module completely down or stopping water flow to any stack unit.

Figure 1B:
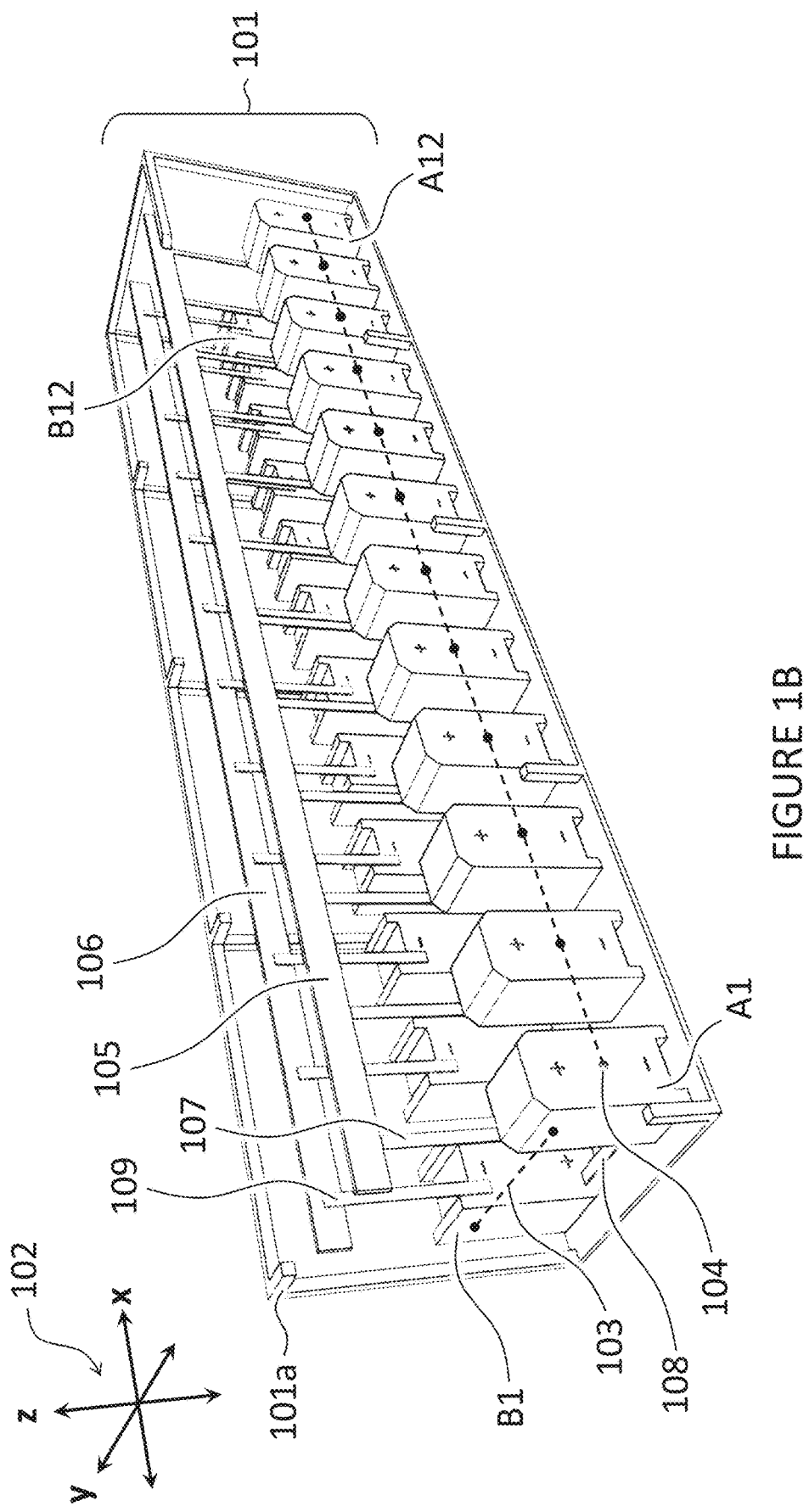
FIG. 1B shows an electrolyzer stack module comprising 24 stacks arranged with 12 branches and 2 banks.

FIG. 1B illustrates a multi-stack electrolyzer module (101) comprising twenty-four individual stack units (A1→A12, B1→B12) within an exemplary container (101*a*). Coordinate system (102) is shown for convenience of description with an x-axis aligned with a long dimension of container (101*a*), a y-axis aligned with a short dimension of container (101*a*), and a z-axis aligned with the height dimension of container (101*a*). The module of FIG. 1B is analogous to the module of FIG. 1A with the addition of a greater number of paired stack branches wired in parallel to bus bars (105) and (106), thereby demonstrating the scalability of the series-parallel scheme as disclosed. The pairwise scheme shown can conceivably be implemented for any even number of stack units greater than four. For instance, 4 stacks total (2-series×2-parallel), 6 stacks total (2-series×3-parallel), 12 stacks total (2-series×6-parallel), 24 stacks total (2-series×12-parallel), or 48 stacks total (2-series×24-parallel). It should be understood, of course, that configurations having more than 2 units in series (e.g. 3, 4, or more stack units per branch) are also within the scope of this application.

FIG. 2A illustrates a table of relative performance (204, 206) for 24 individual stack units determined by a random number generator to simulate production of stacks with a normally distributed ±10% variation in voltage at a target current density. The stack units in FIG. 2A are assigned to a branch (202) and bank (203) randomly and assigned an ID number (205, 207) based on the order in which they were produced and tested. As can be seen, when assigned randomly, stacks with low performance (i.e., higher voltage or positive %) may be paired together such as stack units 003 and 015 in branch 3, while stacks with high performance (i.e., lower voltage or negative %) may be paired together such as stack units 008 and 020 in branch 8. These data are used to calculate the relative performance variation between branches shown in FIG. 3A and FIG. 5A.

FIG. 2B illustrates a table of relative performance (214, 216) for the same 24 individual stack units shown in FIG. 2A. The ID labels (215, 217) are kept consistent with FIG. 2A (205, 207), however the stacks have been assigned to branches (212) and banks (213) based on a rank ordering of the stack by performance (214, 216). In this case stack unit 017 has the lowest performance with a voltage at rated current density 9.45% higher than average, while stack 010 has the highest performance with a voltage at rated current density 8.99% below the average. For the SORTED arrangement shown in FIG. 2B, these two stacks are assigned to the first branch in order to minimize the variation of the branch as a whole, which may be determined by the sum of the performance of the units on the branch. For branch 2, stack unit 013 and unit 004 are paired as unit 013 has the second lowest performance while 004 has the second highest performance. The remainder of the branch pairs are assigned in analogous manner. The process of assignment may be accomplished by 1) listing all stacks' performance in a single column ordered by production time; 2) sorting that column high to low; 3) dividing the sorted column in half; 4) re-sorting the lower half in reverse order—low to high; and 5) matching the lower half with the upper half in side-by-side columns such that the lowest performing stack unit is paired with the highest performing unit.

Figures 3A, 3B:
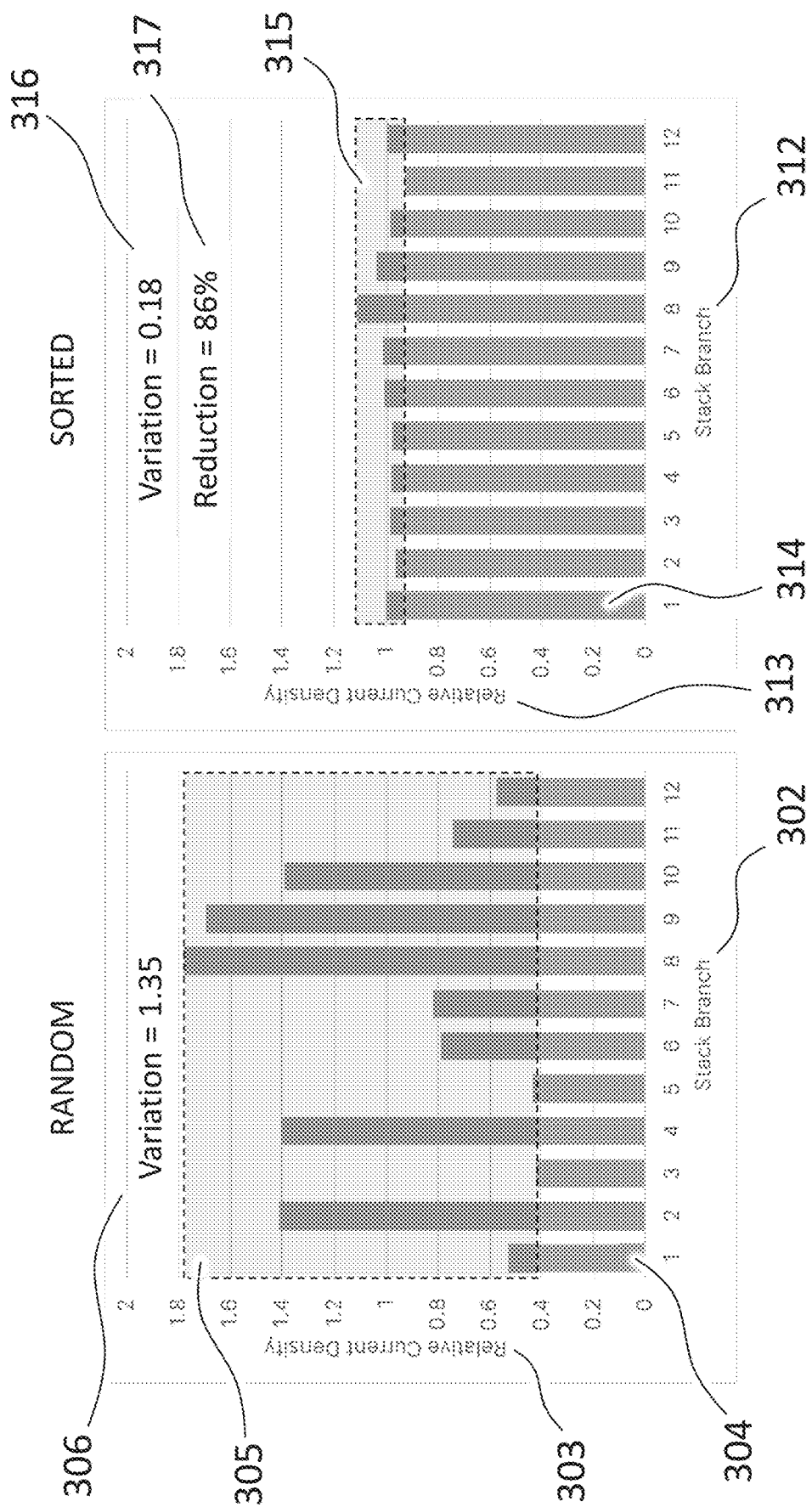
FIG. 3A shows the results of a Monte Carlo simulation for year 0 (beginning of life) of branch-to-branch current density variation for the stack units arranged as shown in FIG. 2A.
FIG. 3B shows the results of a Monte Carlo simulation for year 0 (beginning of life) of branch-to-branch current density variation for the stack units arranged as shown in FIG. 2B.

FIG. 3A illustrates the results of a process simulation for a 24-stack module arranged as depicted in FIG. 1B where stack units are assigned to a branch and bank randomly as illustrated in FIG. 2B. The abscissa (horizontal coordinate) represents stack branch (302) while the ordinate (vertical coordinate) represents relative current density (303) delivered to each branch at a bus voltage that results in a specified hydrogen production rate from the total module (i.e., the hydrogen production rate from all stack units together). Current density for each branch (304) varies due to the variation of individual stack units (±10% as described in FIG. 2A) as well as the RANDOM assignment of stacks to branches. As noted above, branch 3 represents a low performing pair and only draws 0.4× (40%) of the average current density for the module. Conversely, branch 8 is a high performing pair and draws nearly 1.8× (180%) of the average current density for the module. The total variation (305) of the module arranged RANDOMLY as shown in FIG. 3A is 1.35 (306), or ±67.5%. This is significantly more than expected based on the stack-unit variation of just ±10%.

FIG. 3B illustrates the results of a process simulation for a 24-stack module arranged as depicted in FIG. 1B where stack units are assigned to a branch and bank in rank order as illustrated in FIG. 2B. The abscissa represents stack branch (312) while the ordinate represents relative current density (313) delivered to each branch at a bus voltage that results in a specified hydrogen production rate from the total module. Current density for each branch (314) varies due to the variation of individual stack units (±10% as described in FIG. 2A) as well as the SORTED assignment of stacks to branches. As noted above, pairing of stack units in this way allows low performing stack units to be supported by high performing stack units bringing the performance of each branch much closer to the expected average. The total variation (315) of the module arranged SORTED as shown in FIG. 3B is 0.18 (316), or ±9%. This is slightly less than expected based on the stack-unit variation of ±10% and represents an 86% reduction (317) in variation compared to the RANDOM arrangement of the same stacks.

Figure 4:
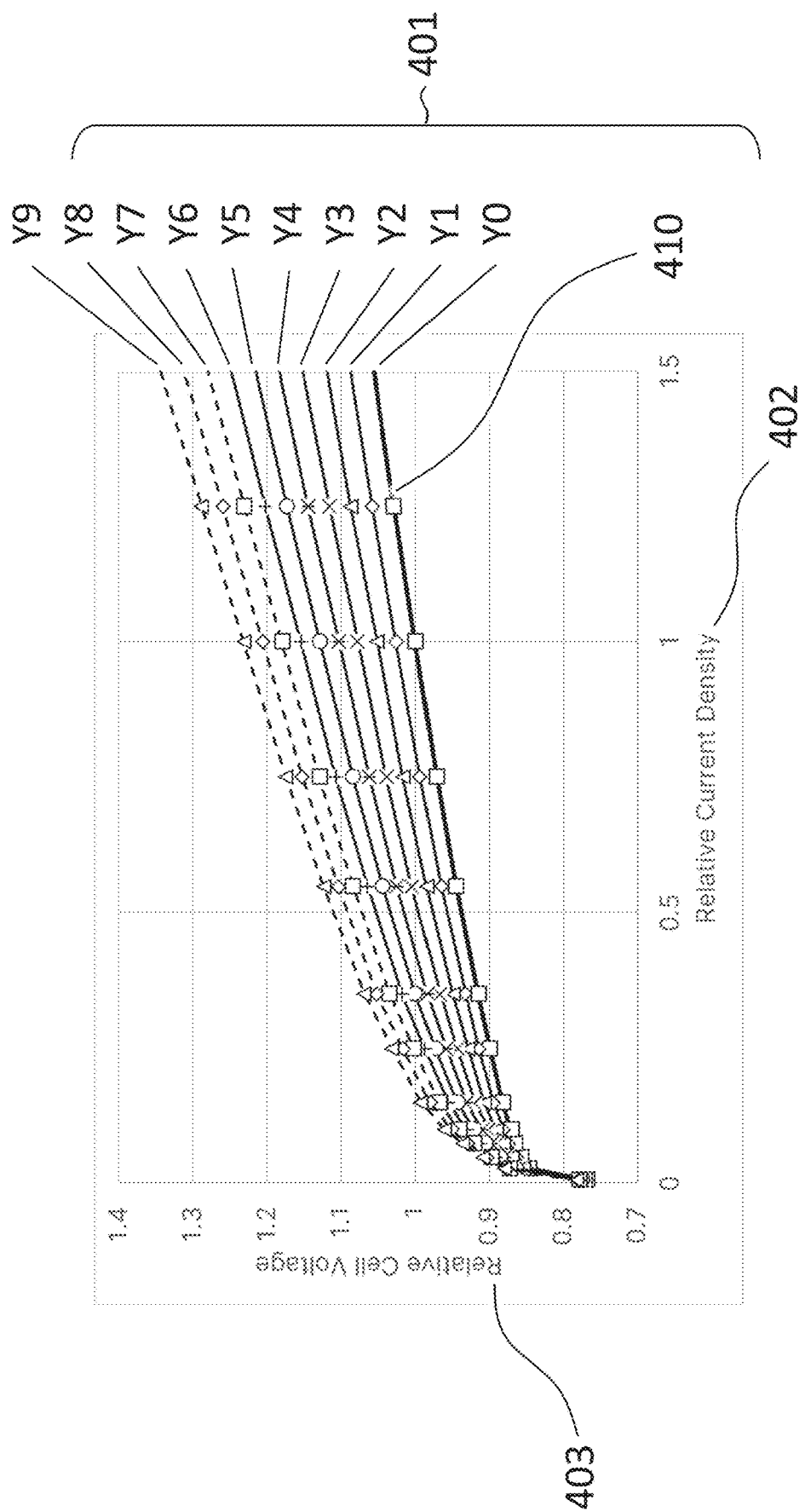
FIG. 4 shows the polarization curves for operational years 0 through 9 for the stack simulations of FIGS. 5A and 5B.
Figures 5A, 5B:
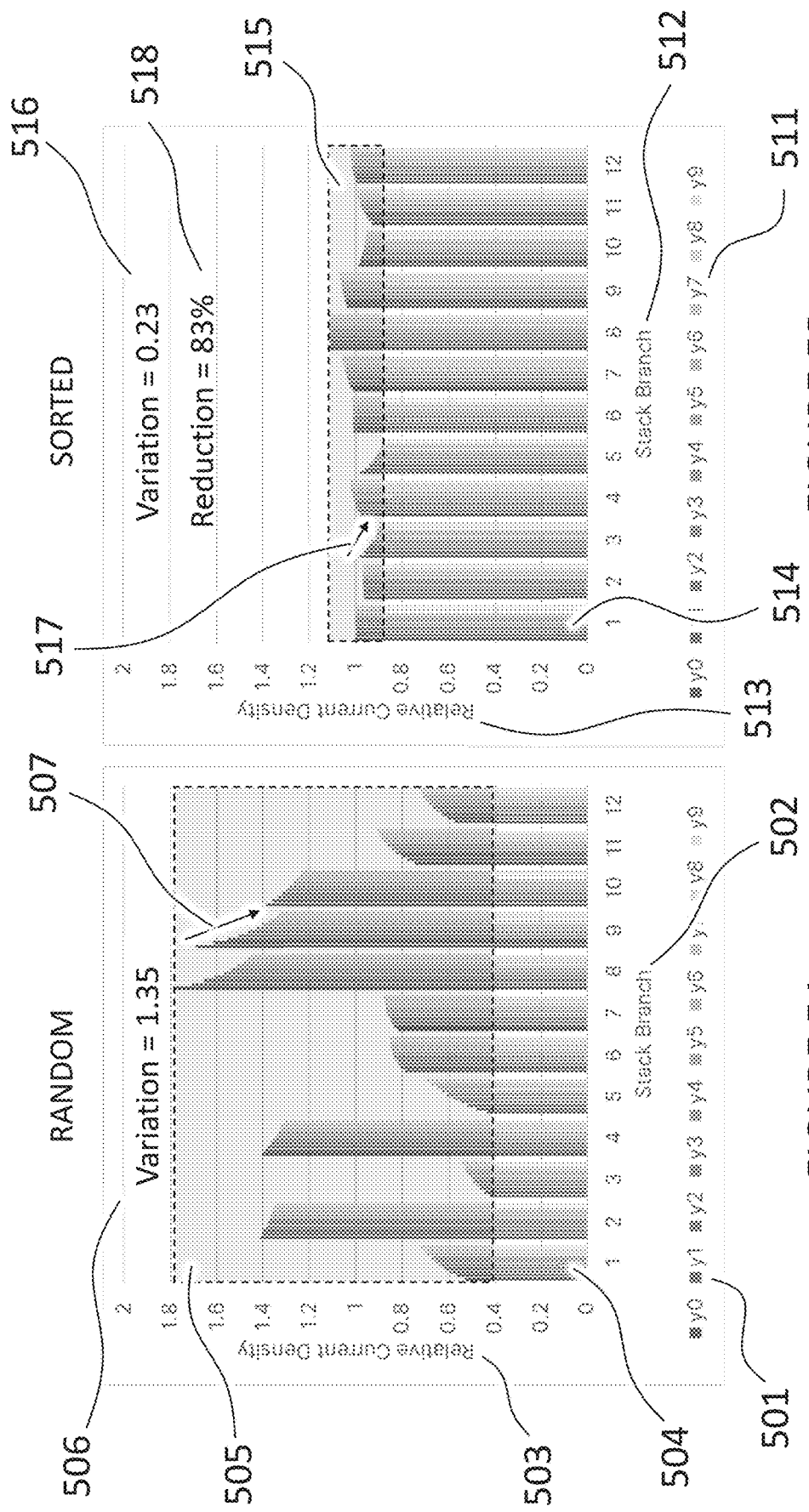
FIG. 5A shows the results of a Monte Carlo simulation for years 0 through 9 of branch-to-branch current density variation for the stack units arranged as shown in FIG. 2A.
FIG. 5B shows the results of a Monte Carlo simulation for years 0 through 9 of branch-to-branch current density variation for the stack units arranged as shown in FIG. 2B.

FIG. 4 illustrates a series of simulated polarization curves (410) over ten years of operation (Y0 through Y9). The abscissa represents relative current density (402), while the ordinate represents relative cell voltage (403). Degradation is assumed linear with time as illustrated by the gradual increase in voltage year over year. These data are used for the Monte Carlo simulation whose results are shown in FIGS. 5A and 5B. The Monte Carlo simulation is done by generating normally distributed, random performance variation factors for each of the 24 stacks for Y0 as well as separate, normally distributed, random performance variation factors for each of the 24 stacks for the decay rate over time. Lookup tables for each of the 24 stacks are then created to enable a series-parallel electric network model to determine the current delivered to each branch for any given pairing of the 24 stacks over time.

FIG. 5A illustrates the results of the Monte Carlo process simulation for a 24-stack module arranged as depicted in FIG. 1B where stack units are assigned to a branch and bank randomly as illustrated in FIG. 2B. The abscissa represents stack branch (502) while the ordinate represents relative current density (503) delivered to each branch at a bus voltage that results in a specified hydrogen production rate from the total module. The individual bars (504) for each branch represent the performance of that branch for each simulated year of operation (Y0 through Y9). Due to the randomly assigned decay variation for each of the 24 stacks, individual bars may increase or decrease with time (507). The bars for Y0 in FIG. 5A are that same as the bars in FIG. 3A. Current density for each branch (504) varies due to the variation of individual stack units ($\pm 10\%$ as described in FIG. 2A) as well as the RANDOM assignment of stacks to branches. As with FIG. 3A, the total variation (505) of the module arranged RANDOMLY as shown in FIG. 5A remains 1.35 (506), or $\pm 67.5\%$. This value changes over time and may get better or worse depending on the chances associated with randomly assigning stacks to branches. A high variation in output between branches is undesirable. The total heat released from a stack is proportional to the power delivered to the stack, i.e., voltage times current. As the voltages of each branch are fixed in this case, the heat released for each stack is therefore proportional to the current in each branch. Cooling for the stacks (to remove the released heat) is accomplished through the water flow delivered to the anode side of each stack. To save cost and complexity and reduce potential failure modes, it is desirable to deliver water flow to each stack without independent control, and with a target of approximately the same water flow rate to each stack. With approximately the same water flow delivered to each stack, the temperature rise of the water flow from each stack inlet to outlet is proportional to the heat to be removed, and, therefore, the current in each branch. As the water delivered to each stack (i.e., inlet temperature) will be at approximately the same mixed temperature, it is expected that the temperature rise, and therefore outlet temperature, for each stack may then vary proportionally to the current in each branch. The lifetime for an electrolyzer stack may be very sensitive to the operating temperature as the degradation mechanisms for the polymer electrolyte membrane and electrodes may be significantly accelerated with increased temperature. Therefore, stacks with the highest current may expose the membrane and electrodes of those stacks to the highest temperature, which, in turn, may result in accelerated degradation of those stacks, a shorter time to reach end of life, and higher maintenance costs to replace those stacks earlier than necessary if they were operated at the average current for all branches in the module.

FIG. 5B illustrates the results of the Monte Carlo process simulation for a 24-stack module arranged as depicted in FIG. 1B where stack units are assigned to a branch and bank in rank order as illustrated in FIG. 2B. The abscissa represents stack branch (512) while the ordinate represents relative current density (513) delivered to each branch at a bus voltage that results in a specified hydrogen production rate from the total module. Current density for each branch (514) varies due to the variation of individual stack units ($\pm 10\%$ as described in FIG. 2A) as well as the SORTED assignment of stacks to branches. As noted above, pairing of stack units in this way allows low performing stack units to be supported by high performing stack units bringing the performance (i.e., current) of each branch much closer to the expected average, with the expected benefit of each stack operating at much closer to the same water outlet temperature than for the RANDOM arrangement. The total variation (515) of the module arranged SORTED as shown in FIG. 3B is 0.23 (516), or $\pm 11.5\%$. This is slightly more than expected based on the stack-unit variation of $\pm 10\%$, and represents an 83% reduction (518) in variation compared to the RANDOM arrangement of the same stacks. This result is also impacted by random variation in degradation rate assigned to the 24 stacks. Degradation rate is not something that can be measured at the beginning of life (BoL), and therefore cannot be a factor considered in the sorting process. However, the simulation demonstrates that even when sorting only for BoL performance, the impact of random variation in degradation may not be excessive. Given operational life data for the module, the sorting process could be repeated at any point in time to reduce the variation and improve overall module performance through a service intervention.

Figure 6:
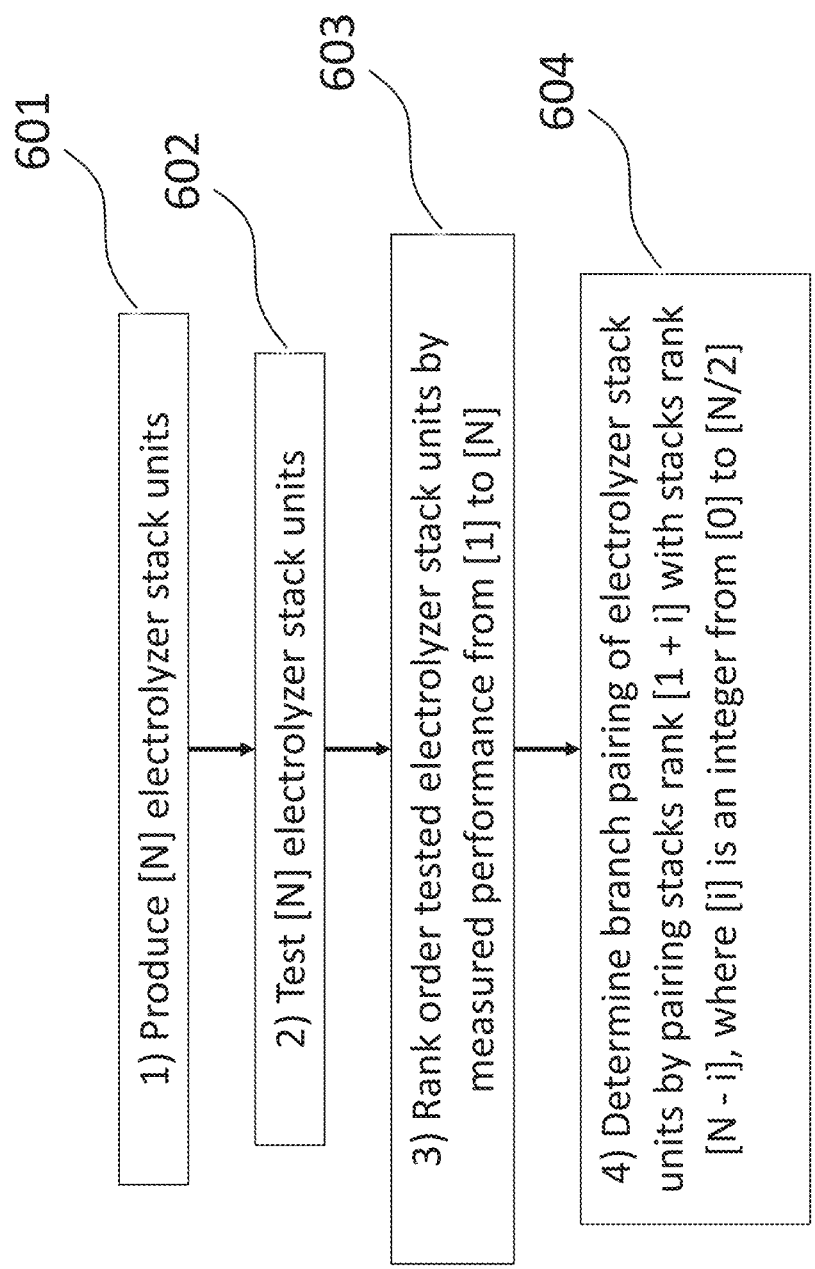
FIG. 6 shows a flow chart for determining the optimal stack pairing for an electrolyzer stack module containing an even number [N] of stack units according to a preferred embodiment of the present invention.

FIG. 6 illustrates an exemplary procedure for rank ordering and matching stack units for installation into a module in pairs. Step 1 (601) comprises producing a quantity [N] of stack units to be installed as a series-parallel electrical network in a single stack module. Step 2 (602) comprises testing the [N] stack units for performance to identify a key performance indicator, such as a voltage at a given current density, or a current density at a given applied voltage, or a hydrogen production rate at a given applied voltage. Step 3 (603) comprises ranking the [N] tested stacks in order of tested performance from [1] to [N]. Step 4 (604) comprises pairing the stacks by ranked order, where stack [1] is paired with stack [N], stack [2] is paired with stack [N−1], stack [3] is paired with stack [N−2], and so on until all stack units have been assigned to a pair. The resulting pairs of stack units may then be installed in the module branches in order to ensure that variation from branch to branch is minimized as shown in FIGS. 3A & 3B and FIGS. 5A & 5B. It should also be understood that steps 2-4 may also be undertaken throughout the lifespan of the stack units in order to rearrange the stack units to again minimize branch variation. For example, steps 2-4 may be performed every 3, 6, 9 or 12 months, or 1, 2, 3, 4, or 5 years. After determining the branch pairing that minimizes variation, the stack units may be physically or electrically reconfigured as discussed herein.

Figure 7:
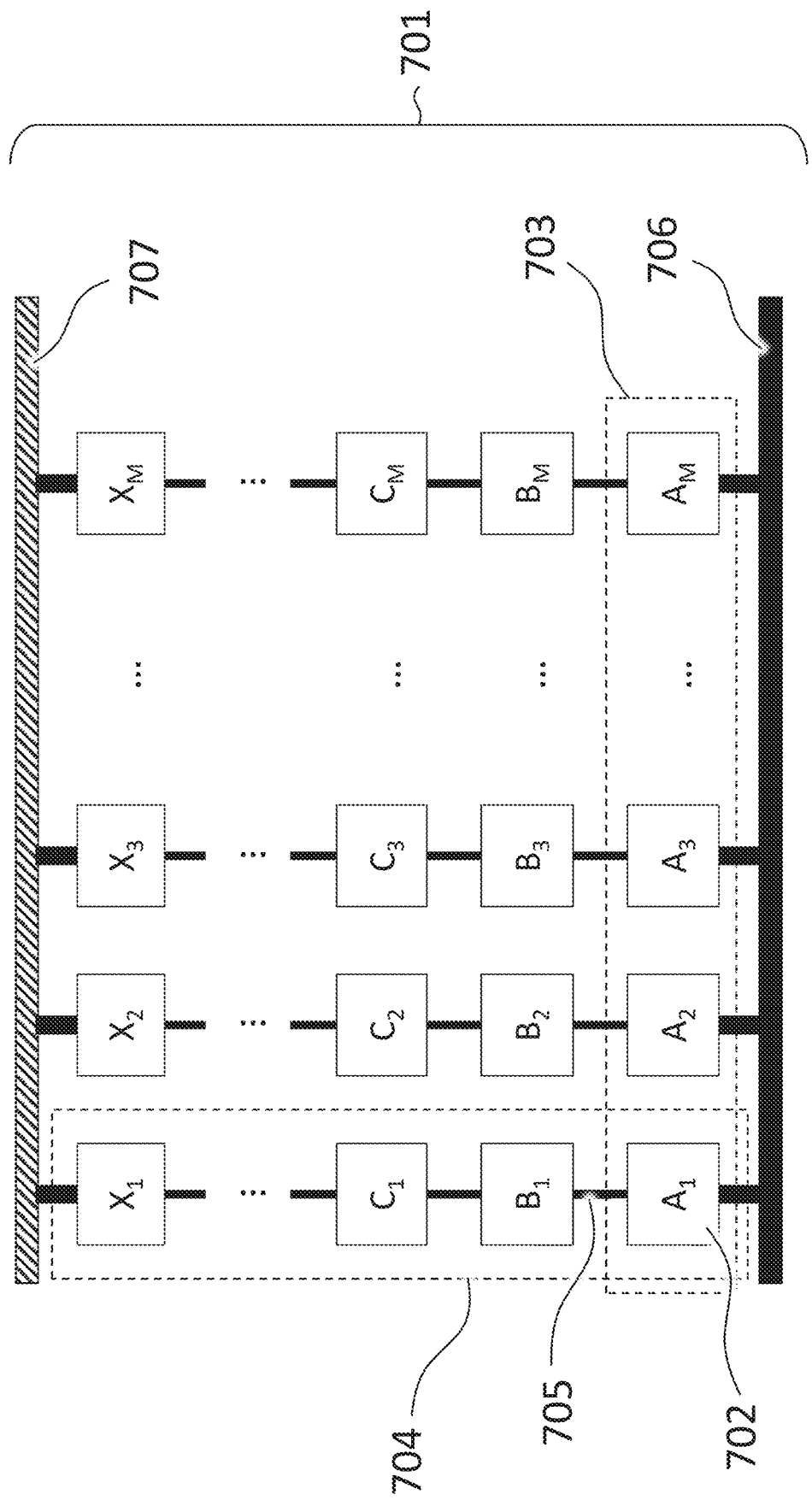
FIG. 7 shows network diagram for a general arrangement of multiple stacks within a module.

FIG. 7 illustrates a general network diagram (701) for stack unit (702) arrangement in an electrolyzer stack module consisting of any number of stack units in accordance with the present invention. Branches of stack units (704) are labelled with subscripts 1, 2, 3, through M. Banks of stack units (703) are labelled with variables A, B, C, through X. The positive terminals of stack units in stack bank A are connected in parallel to the positive bus bar (706), which may be connected to the positive terminal of an electrical supply system (not shown). The negative terminals of stack units in stack bank X are connected in parallel to the negative bus bar (707), which may be connected to the negative terminal of an electrical supply system (not shown).

Interconnections (705) between the stacks of each branch are made by wiring in electrical series—negative of stack unit A1 to positive of stack unit B1; negative of stack unit B1 to positive of stack unit C1; and so on until all stack units in all branches have been electrically connected. The process for selecting how stack units should be assigned to branches follows the same logic as described for the more specific case of 2 stack units per branch above (FIG. 6). In this case any number of algorithms may be employed with the objective of minimizing impedance variation between branches in the network given a set of stack units (702) and network architecture (701). Such algorithms may include simply processes such as least-squares fitting, or more complicated processes involving machine learning or artificial intelligence. Such algorithms for optimization are well known in network design and any number of different, specific methods may be employed by those skilled in the art to accomplish the objectives of the present invention.

Figure 8:
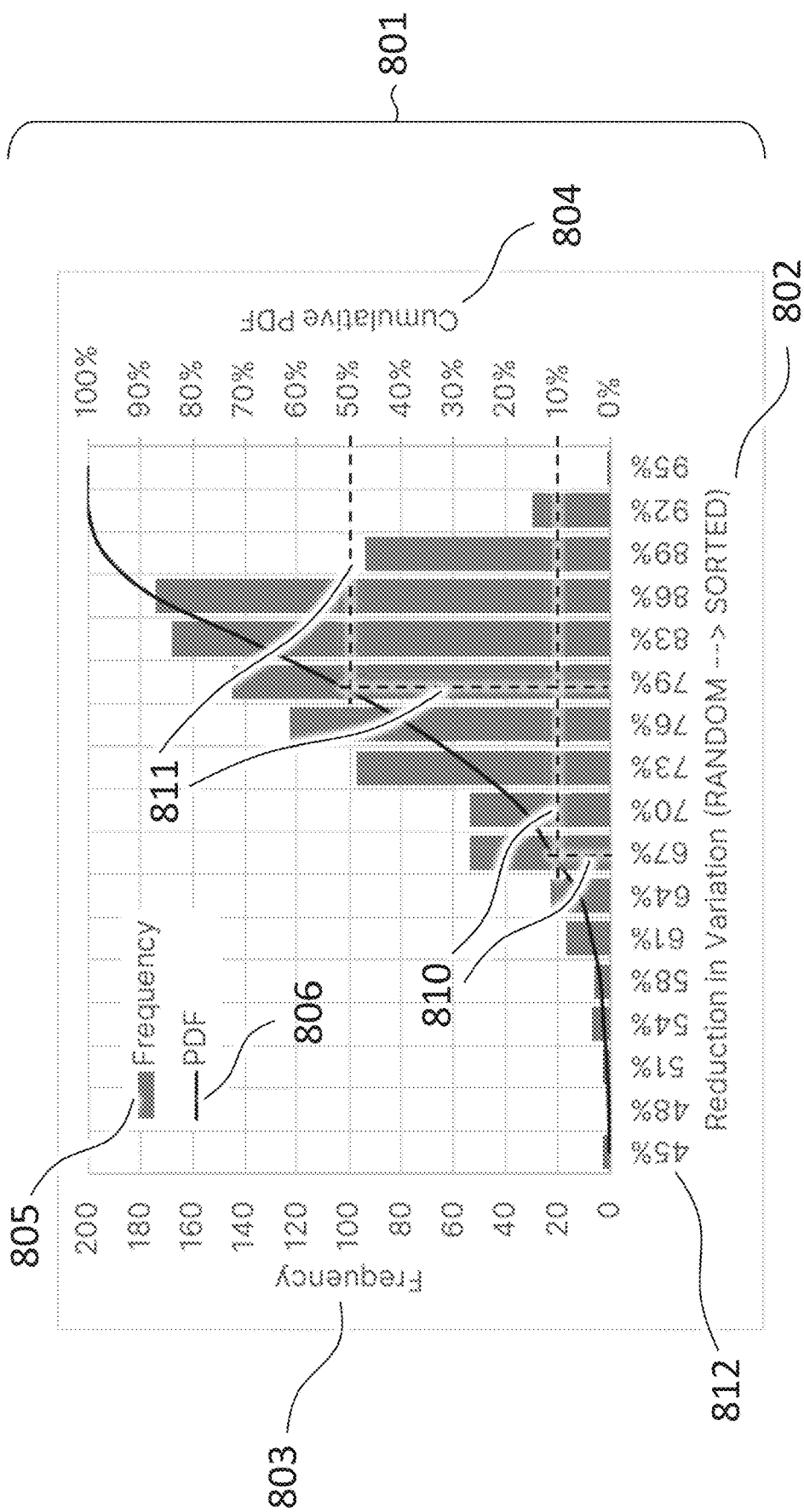
FIG. 8 shows the output of a Monte Carlo simulation of the benefit to reducing variability that may be expected in applying an exemplary embodiment of the present invention.

FIG. 8 illustrates the results of a Monte Carlo simulation (801) involving 1,000 discrete simulations of applying the exemplary embodiment of the present invention illustrated in the 24-stack electrolyzer module of FIG. 1B. Each of the 1,000 simulations is the equivalent of the process described for FIG. 5B with new, normally distributed, random distribution stack performance and decay rate factors applied to each discretely simulated case. The assumed performance variation for each simulated stack is ±10% and the assumed decay rate variation for each simulated stack is ±15%. The chart of FIG. 8 displays a histogram of frequency (803, 805) and cumulative probability density (804, 806) for the reduction in branch-to-branch variation (802) when rearranging a given set of 24 stacks from RANDOM pairing to SORTED pairing. The result (802) is the equivalent of the "Reduction" (517) value described in FIG. 5B, but for each of the 1,000 simulations performed. Lines (810) highlight the outcome that only 10% of the simulations resulted in a reduction of variation of less than 67%. In other words, there is a 90% probability (100%-10%) of the present invention resulting in a reduced variation of 67% or more. Lines (811) highlight the result that only 50% of the simulations resulted in a reduction of variation of less than 79%. In other words, there is a 50% probability (100%-50%) of the present invention resulting in a reduced variation of 79% or more. In no case was the reduction in variation less than 45% (812), which may indicate that the present invention results in a very high probability (>99%) of significant reduction in variation when applying the present invention to a series-parallel network of electrolyzer stack units.

Figure 9:
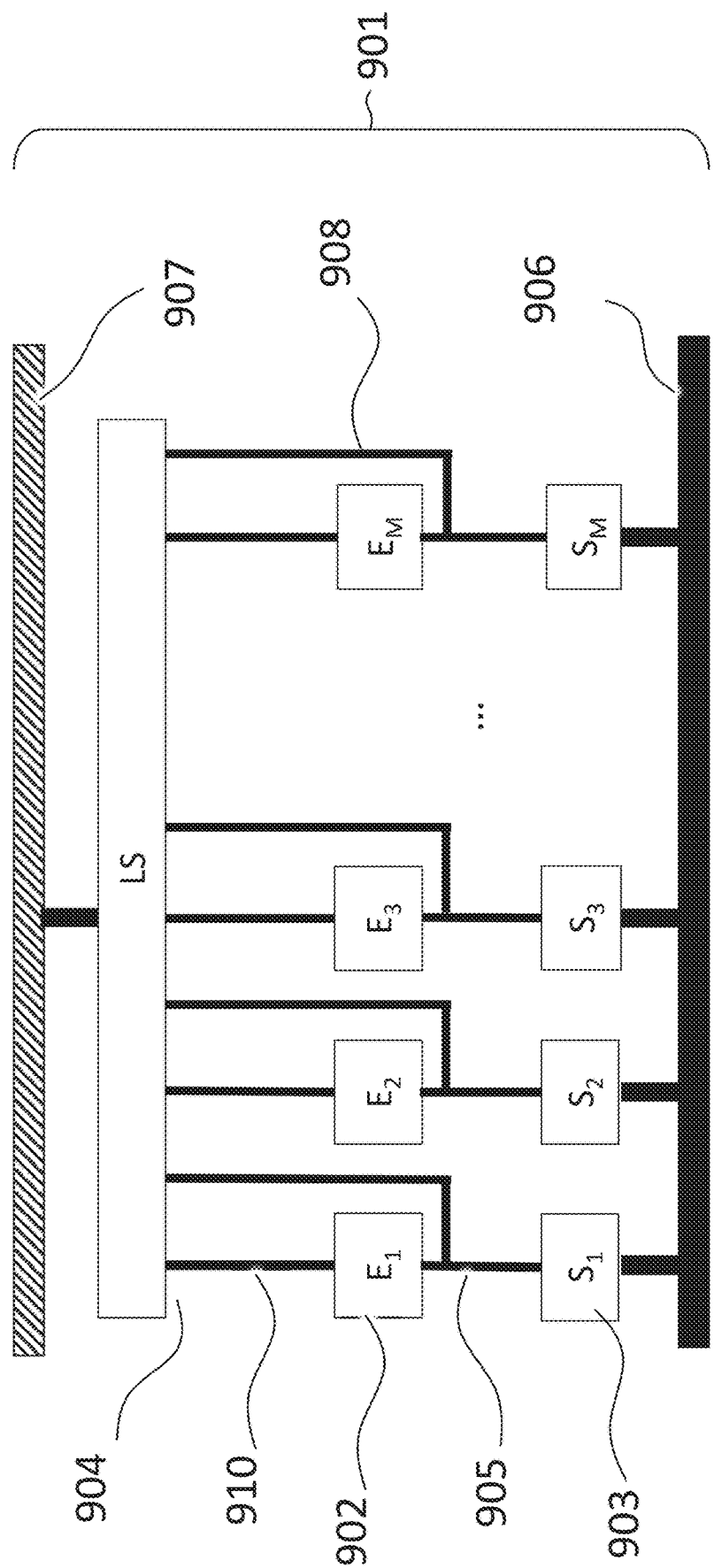
FIG. 9 shows another embodiment of a network diagram for a general arrangement of multiple stacks within a module.

FIG. 9 illustrates another embodiment of a general network diagram (901) for stack unit (902) arrangement in an electrolyzer stack module consisting of any number of stack units (902) accordance with the present invention. The stack units (numbered $E_1$ to $E_M$) may be arranged in an ordered (e.g. arrayed) physical configuration, but they need not necessarily be. The positive terminals of stack units are connected to switches (903) (numbered $S_1$ to $S_M$) via connections (905), which switches (903) are connected to the positive bus bar (906) and thus control electrical continuity between the positive bus bar and the stack units. The negative terminals of stack units are connected to load switch box (904) (also labelled "LS"), which contains electrical connections to the negative bus bar (907) and the positive terminals of each of the stack units via connections (908). The load switch box also contains multiple independent manually operated or automatically controlled switches (or jumpers) for controlling the connections between the negative terminals and positive terminals of the stack units. By operation of the switches, the negative terminal of any one stack unit may be electrically connected to the positive terminal of any other stack unit, or to the buss bar. In this way, by operation of a plurality of switches in the load switch box, the stack units may be electrically arranged in any possible series-parallel configuration based on the total number of stack units present. Alternatively, a plurality of load switches may also be used, each containing a subset of the functionality described herein.

For example, in one embodiment, the load switch box may contain a patch panel system, where removable conductive links or jumpers can be manually or automatically inserted or removed to establish different electrical connection patterns between the stack units while maintaining the fundamental series-parallel relationship. In another embodiment, the load switch box may contain a matrix of electromagnetic relays or contactors. Each relay or contactor can establish or break connections between the positive and negative terminals of specific stack units under automated control. Control of each switch may be tied to measurements of each individual stack unit performance or performance of individual cells within the stack (as discussed in more detail above), or may simply be based on local or remote manual operation by a user. The relay/contactor matrix enables reconfiguration without manual intervention while providing electrical isolation between switching elements. The load switch box may also utilize high voltage/high current solid state switches, such as insulated gate bipolar transistors (IGBTs) or thyristors, to route current between loads through electronic control signals. The overall network may also include other loads (not pictured), e.g. purely resistive loads (with appropriate heat sinks) or energy capturing loads (such as battery/charging systems), which can be optionally connected by the load switch box in series-parallel with one or more operational stack units to temporarily replace a defective stack unit, a stack unit under maintenance, or a stack unit being replaced, without requiring shutdown of the other operational stack units.

The foregoing description of preferred embodiments has been presented for purposes of illustration and description only. It is not intended to be exhaustive or to limit the application to the precise form disclosed, and modifications and variations are possible and/or would be apparent in light of the above teachings or may be acquired from practice of the application. The embodiments were chosen and described in order to explain the principles of the application and its practical application to enable one skilled in the art to utilize the application in various embodiments and with various modifications as are suited to the particular use contemplated. It is intended that the scope of the application be defined by the claims appended hereto and that the claims encompass all embodiments of the application, including the disclosed embodiments and their equivalents.

Further Embodiments

A-1. A multi-stack electrolyzer module comprising
at least two (2) stack branches, each stack branch comprising at least two (2) stack units wired in electrical series, wherein each stack branch contains a positive terminal, a negative terminal, and interconnect wiring, wherein the at least two (2) stack branches are wired in electrical parallel to form at least two (2) stack banks, wherein the total number of stack units in the electrolyzer module is at least four (4), and wherein the positive terminal of each stack branch is connected to a positive side of an electrical supply system and the negative terminal of each branch is connected to a negative side of an electrical supply system.

A-2. The electrolyzer module of A-1, wherein the at least four (4) stack units are arranged in stack branches and stack banks in such a way to minimize electrical impedance variation between the branches.

A-3. The electrolyzer module of any of A-1 to A-2, wherein the at least four (4) stack units are arranged in stack branches based on one or more beginning of life performance factors selected from the group consisting of a voltage at an applied current, a current at an applied voltage, and a hydrogen production rate at an applied current.

A-4. The electrolyzer module of any of A-1 to A-3, wherein the at least (4) stack units each have a mass of less than or equal to 2,000 kilograms.

A-5. The electrolyzer module of any of A-1 to A-4, wherein the at least (4) stack units each have a power consumption of between 250 kilowatts and 5 megawatts.

A-6. The electrolyzer module of any of A-1 to A-5, wherein the total number of stack units is less than or equal to 48.

A-7. The electrolyzer module of any of A-1 to A-6, wherein the at least (4) stack units are arranged within a standard ISO container of 40 feet or less in length.

A-8. The electrolyzer module of any of A-1 to A-7, wherein the total number of stack units is an even number, and wherein stack units are arranged in pairs with two (2) stack units per branch.

A-9. The electrolyzer module of A-8, wherein the stack unit(s) in a first of stack bank are installed upside down relative to the stack unit(s) in a second stack bank.

A-10. The electrolyzer module of any of A-8 to A-9, wherein stack unit pairs are arranged in an arrayed configuration obtained by iteratively pairing the best performing stack unit remaining with the worst performing stack unit remaining until all stacks have been assigned to a pair.

B-1. A method of assembling an electrolyzer module comprising
  providing a plurality of stack units;
  testing each of the plurality of stack units to determine one or more performance parameters of said stack units;
  ranking each of the plurality of stack units by one or more of the performance parameters measured;
  determining branch pairing by pairing the best performing stack unit remaining with the worst performing stack unit remaining until all stacks have been assigned to a pair;
  assembling the electrolyzer module by electrically connecting the paired stack units in series to form a plurality of branches, and electrically connecting the plurality of branches in parallel.

C-1. An electrolyzer stack module service method comprising
  after a period of normal operation of the electrolyzer stack module, determining one or more operating performance parameters of a plurality of stack units, wherein the stack units are arranged in branches comprising two or more stack units electrically connected in series, wherein two or more branches are electrically connected in parallel;
  determining new branch pairings by pairing the best performing stack unit remaining with the worst performing stack unit remaining until all stacks have been assigned to a pair;
  rearranging the plurality of stack units according to the new branch pairings to obtain a new configuration of the electrolyzer stack module.

D-1. An electrolyzer stack module comprising
  electrical disconnects arranged to electrically isolate individual branches of stack units from a voltage source based on measured operating performance without shutting off a source water flow to the isolated branch.

What is claimed is:

1. A multi-stack electrolyzer module comprising
  at least two (2) stack branches, each stack branch comprising at least two (2) stack units wired in electrical series, wherein each stack branch contains a positive terminal, a negative terminal, and interconnect wiring, wherein the at least two (2) stack branches are wired in electrical parallel to form at least two (2) stack banks, wherein the total number of stack units in the electrolyzer module is at least four (4), wherein the positive terminal of each stack branch is connected to a positive side of an electrical supply system and the negative terminal of each branch is connected to a negative side of an electrical supply system, wherein the total number of stack units is an even number, wherein stack units are arranged in pairs with two (2) stack units per branch, and wherein stack unit pairs are arranged in an arrayed configuration obtained by iteratively pairing the best performing stack unit remaining with the worst performing stack unit remaining until all stacks have been assigned to a pair.

2. The electrolyzer module of claim 1, wherein the best performing stack unit and the worst performing stack unit are determined based on one or more beginning of life performance factors selected from the group consisting of a voltage at an applied current, a current at an applied voltage, and a hydrogen production rate at an applied current.

3. The electrolyzer module of claim 1, wherein each stack unit of the at least four (4) stack units has a mass of less than or equal to 2,000 kilograms.

4. The electrolyzer module of claim 1, wherein each stack unit of the at least four (4) stack units has a power consumption of between 250 kilowatts and 5 megawatts.

5. The electrolyzer module of claim 1, wherein the total number of stack units is less than or equal to 48.

6. The electrolyzer module of claim 1, wherein the at least four (4) stack units are arranged within a standard ISO container of 40 feet or less in length.

7. The electrolyzer module of claim 1, wherein the stack unit(s) in a first of stack bank are installed upside down relative to the stack unit(s) in a second stack bank.

8. A method of assembling an electrolyzer module comprising
  providing a plurality of stack units;
  testing each of the plurality of stack units to determine one or more performance parameters of said stack units;
  ranking each of the plurality of stack units by one or more of the performance parameters measured;
  determining branch pairing by pairing the best performing stack unit remaining with the worst performing stack unit remaining until all stacks have been assigned to a pair;
  assembling the electrolyzer module by electrically connecting the paired stack units in series to form a plurality of branches, and electrically connecting the plurality of branches in parallel to form a multi-stack electrolyzer module according to claim 1.

9. An electrolyzer stack module service method comprising after a period of normal operation of a multi-stack electrolyzer module according to claim 1, determining one or more operating performance parameters of a plurality of stack units, wherein the stack units are arranged in branches comprising two or more stack units electrically connected in series, wherein two or more branches are electrically connected in parallel;

determining new branch pairings by pairing the best performing stack unit remaining with the worst performing stack unit remaining until all stacks have been assigned to a pair;

rearranging the plurality of stack units according to the new branch pairings to obtain a new configuration of the multi-stack electrolyzer module.

10. The multi-stack electrolyzer module according to claim 1, further comprising electrical disconnects arranged to electrically isolate individual branches of stack units from a voltage source based on measured operating performance without shutting off a source water flow to the isolated branch.

\* \* \* \* \*